May 14, 1940.  V. E. ROYLE  2,200,997
EXTRUDING MACHINE
Filed Jan. 29, 1937  2 Sheets-Sheet 1
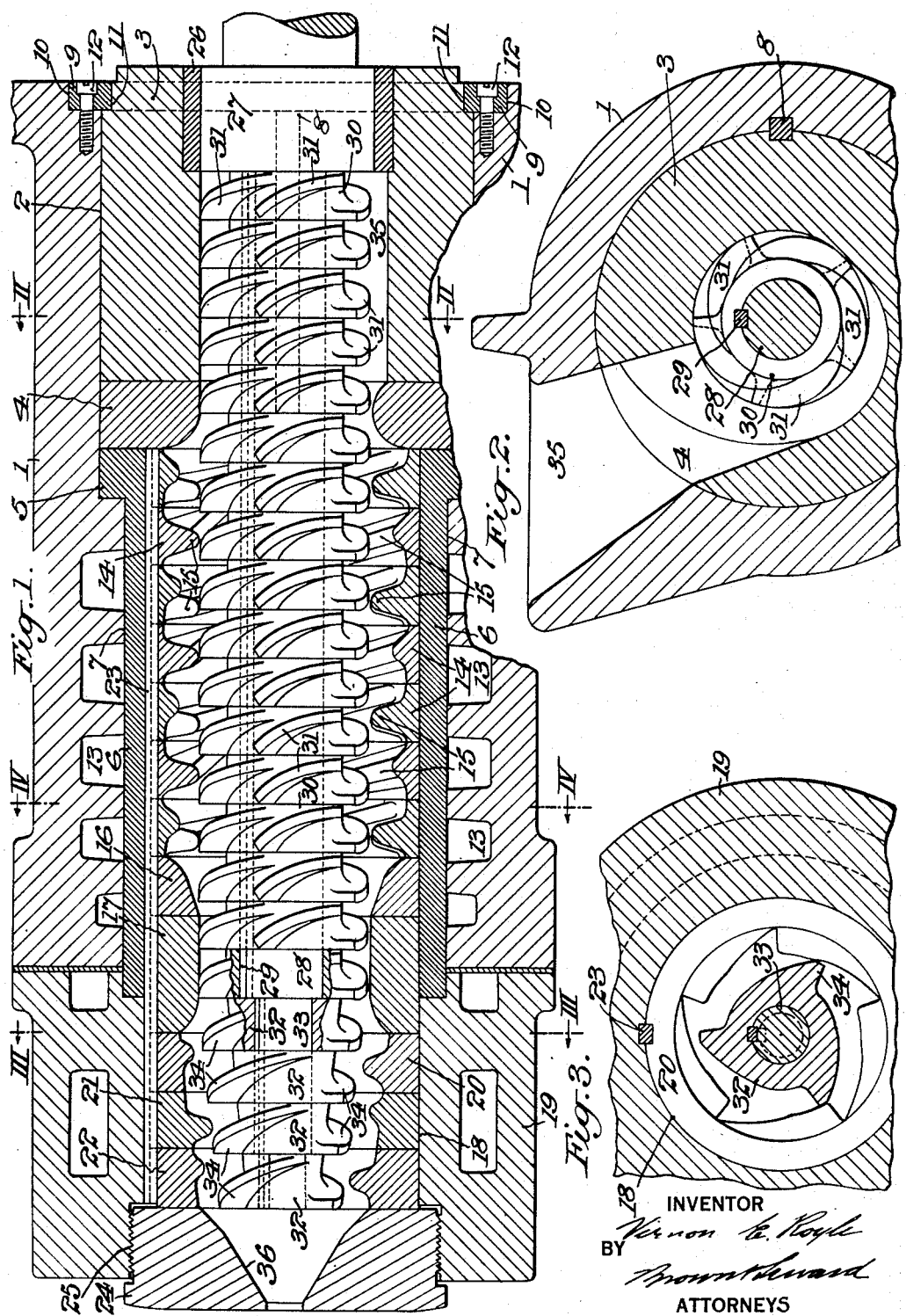
INVENTOR
Vernon E. Royle
BY
ATTORNEYS May 14, 1940.                V. E. ROYLE                2,200,997
                           EXTRUDING MACHINE
                          Filed Jan. 29, 1937              2 Sheets-Sheet 2
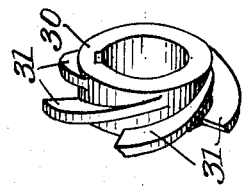
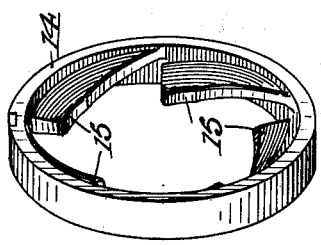
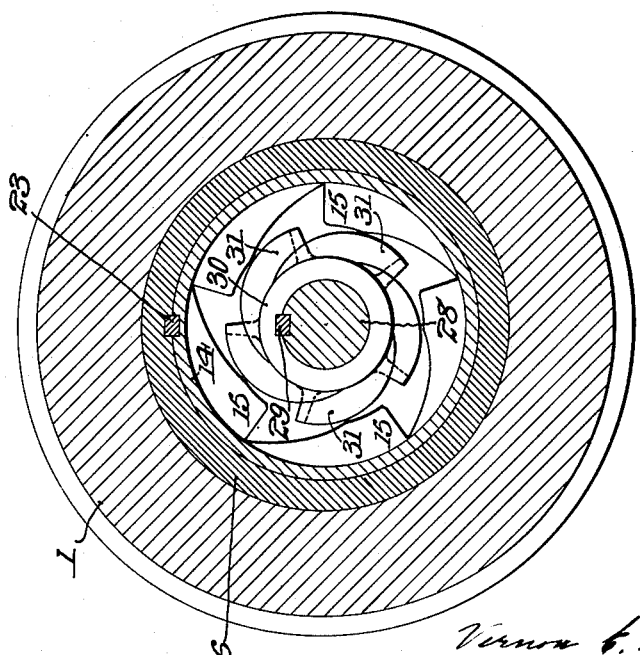
INVENTOR.
BY  Vernon E. Royle
ATTORNEYS Patented May 14, 1940

2,200,997

UNITED STATES PATENT OFFICE 2,200,997

EXTRUDING MACHINE

Vernon E. Royle, Paterson, N. J.

Application January 29, 1937, Serial No. 122,937

5 Claims. (Cl. 18—12)

This invention relates to an extruding machine designed primarily for the purpose of forming a rod or rope of plastic crude rubber which has been affected by a kneading or breaking up action and by heat so as to improve its adaptability for compounding and use in the rubber industry.

The invention has for an object the provision of a machine of the nature of an extruding machine, but which acts upon the rubber in a manner analogous to the action of a mill so as to treat or break up the crude rubber for purposes well understood in the industry.

Another object consists in providing such a machine that includes a stock screw or plodder having a plurality of screw threaded sections mounted on a shaft and which are removable and interchangeable.

Another object consists in providing such a machine that includes a stock screw having a plurality of sections juxtaposed on a shaft, each of which sections is formed with a plurality of partial threads, each of said threads being shallow at one end and graduating forwardly to a substantial height at the other end, whereby the rubber mass will be broken up and passed through the cylinder to the extruding outlet.

Another object consists in providing such a machine that includes a sectional stock screw surrounded by a series of threaded elements which lie in a direction out of conformity of the thread on the sections of the screw to resist the forward movement of the crude rubber driven by the screw sections and thereby additionally break it up and heat it through friction while permitting its passage to the extruding outlet.

Another object consists in providing certain improvements in the form, construction and arrangement of the several parts whereby the above named and other objects may effectively be attained.

A practical embodiment of my invention is represented in the accompanying drawings, in which—

Fig. 1 represents a detail longitudinal section through the cylinder and head of an extruding machine having my improvement applied thereto;

Fig. 2 represents a vertical section taken in the plane of the line II—II of Fig. 1, looking in the direction of the arrows;

Fig. 3 represents a detail vertical section taken in the plane of the line III—III of Fig. 1, looking in the direction of the arrows;

Fig. 4 represents a vertical section taken in the plane of the line IV—IV of Fig. 1, looking in the direction of the arrows;

Fig. 5 represents a perspective view of one of the elements surrounding the screw; and Fig. 6 represents a perspective view of one of the screw sections.

The cylinder of the machine denoted by 1 is formed with a longitudinal bore 2 arranged to receive a liner 3, an element 4, and a flange 5 of a sleeve 6 which is fitted in a reduced longitudinal bore 7 of the cylinder. The liner 3 and element 4 are held against rotation in the bore 2 by a key or spline 8. The liner 3, element 4 and flange 5 are secured against longitudinal movement in the bore 2 by a ring 9, a portion of which is seated in a recess 10 in the cylinder, while the remainder rests in a recess 11 in the liner 3. The ring 9 is secured to the cylinder by means of cap screws 12. The walls of the cylinder surrounding the sleeve 6 are grooved to constitute chambers or passages 13 for the circulation of a temperature controlling medium such, for instance, as hot water or steam.

The element 4 is formed on its inner periphery substantially like a partial screw thread or a screw thread cut through on a plane normal to the longitudinal axis of the cylinder.

The interior of the sleeve 6 is furnished with a number of rings, in the present instance seven are shown located forwardly of the element 4, all of which are similar in structure and denoted by 14. Each ring 14 has its inner circumference fashioned to constitute a series of partial threads 15 which are all alike. Each partial thread is of substantial depth, considered in a radial direction, at one end where it is formed with a small curved portion concentric with the ring (see Fig. 5) and then gradually tapers off until the other end merges into the inner circumference of the ring. The deep end of each partial thread is adjacent one side edge of the ring and the shallow end is adjacent the opposite side edge, which arrangement is due to the pitch or slanting formation of the partial threads. Furthermore, the deep end of each partial thread 15 is adjacent the shallow end of the next partial thread considered in a circumferential direction, but the said deep and shallow ends are offset from each other in an axial direction because of the slant or longitudinal pitch of the partial threads. While these rings 14 are all similar, they are arranged in staggered relationship, considered in a circumferential direction, within the sleeve 6 and this arrangement is such that the deep part of each partial thread of a ring 14 is substantially in axial alinement with the shallow part of a partial thread on an adjacent ring. This arrangement prevents a series of interior axial grooves being established in the set of rings 14 and produces a series of sinuous or zigzag interior channels extending axially between the partial threads on the rings.

Forwardly of the set of seven rings 14, two rings 16 and 17 are located within the sleeve 6. The ring 16 has its inner circumference tapered in cross section from the rear edge to the forward edge so as to restrict its front diameter, while the inner circumference of the ring 17 is straight for a portion and tapered in cross section therefrom to a forward edge of the ring to increase its front diameter. In advance of the rings 16, 17 and within a longitudinal bore 18 in a head 19, three rings 20, 21, 22 are likewise formed on their inner peripheries with threads similar to those shown and described with respect to the rings 14, but less pronounced. Furthermore, the inner circumferences of the rings 20, 21, 22 diminish toward the forward edges so as to restrict the front diameters.

In order to prevent circumferential movement of any of the rings, an elongated key or spline 23 is provided, which extends from the rear face of the element 4 through the sleeve 6 and head 19 to a discharge nozzle 24 which is screw threaded at 25 in the head 19. This nozzle 24 also serves to removably hold the rings 14, 20, 21 and 22 in position in the liner 3 and head 19.

The liner 3 is shouldered to house a bearing 26 that receives and journals the enlarged rear portion 27 of a shaft 28. This shaft 28 is arranged to receive a series of screw or plodder sections, in the present instance twenty-one similar sections are shown secured thereon and against longitudinal displacement in any well known or approved manner, preferably by shrinking the sections on the shaft. In addition, the sections are prevented from rotating by means of a key or spline 29 which extends the length of the shaft forwardly of the rear portion 27. Each screw section comprises a hub 30 and a plurality of partial threads 31 extending outwardly therefrom. Each thread 31 is similar and is of substantial height, considered in a radial direction, at one end and gradually tapers off until the other end merges into the outer circumference of its hub. The high end of each partial thread is adjacent one side edge of the hub and the other or low end is adjacent the opposite side edge, which arrangement is due to the pitch or slanting formation of the partial threads. Furthermore, the high end of each partial thread is adjacent the low end of the next partial thread considered in a circumferential direction, but the said high and low ends are offset from each other in an axial direction because of the slant or longitudinal pitch of the threads, as shown in Figs. 1 and 6.

While these threaded sections are all alike, they are arranged in alinement considered in a circumferential direction, on the shaft 28 and this arrangement is such that the high part of each partial thread of one section is substantially in axial alinement with the high part of a thread on an adjacent section. It is to be noted that the high portions of the partial threads on the sections have such a radial dimension as substantially to contact with the deep portions of the partial threads on the rings, and that the longitudinal pitch or angularity of the partial threads on the sections is opposite to that of the co-operating partial threads of the rings.

It is to be pointed out that the four sections 32 on the end of the shaft 28 adjacent the head 19 are keyed on a reduced end 33 of the shaft 28. These sections are progressively tapered and provided with a set of three partial threads 34 which are constructed and arranged similar to that described with respect to the partial threads 31 on the sections hereinabove described, except that the high portions of the partial threads on one section are diminished with respect to the high portions on the adjacent section.

The two screw sections adjacent the cylindrical inner periphery of the ring 17 are intended to contact it with the high portions of their partial threads and establish a front bearing for the sectional screw.

That portion of the cylinder 1 adjacent the liner 3 is provided with a throat 35 that is designed for the in-feeding of the crude rubber, and the corresponding wall of the liner 3 is cut away, as clearly shown in Fig. 2 in order to permit the rubber to pass to the sectional screw so as to be forced forwardly by the latter in the usual way. The particular construction of these parts is set forth in United States Patent No. 1,645,157, dated October 11, 1927, and it suffices here to note that the throat has an eccentric portion for easing the feed of the material to the sectional screw.

The result of the form and arrangement of the parts, just described, is that the forward movement of the crude rubber is strongly resisted and a severe breaking up action is applied to the rubber. Passages are provided to permit of the forward movement, but they are so formed as to restrict it and to intermittently severely check it. This action is increased by the partial threads on the sections and their coaction with the staggered partial threads on the rings surrounding the sections because this correspondingly constricts the area of the passages through which the material is forced. Such constriction is permissible and advantageous because the heating of the material due to friction in addition to the medium circulating chambers 7, together with the breaking up action, progressively brings the material to such a condition that it is more easily fed forward by the screw and it must, therefore, be subjected to more severe restrictions upon its movement if the full effect of friction and the full effect of the breaking up action are to be maintained.

At the forward end of the sections 32 the nozzle 24 is formed with a die opening 36 that is in the form of a truncated cone which also tapers forwardly. The taper of the die opening 36 imparts a crowding and compressing action to the material as it is extruded in the form of a rod or rope, which may be cut into convenient lengths for shipment or use in accordance with the demands of the situation.

This form of sectional screw is exceptionally adapted to the in-feeding of strip material such, for instance, as is provided by a rubber calender. Another advantage resides in the fact that it is cheaper to manufacture this form of screw, since the sections are removable and interchangeable. The removability of the rings enables any of them to be reversed in position if desired; and this particularly relates to reversing some or all of the rings 14 so as to make them correspond to the angularity instead of conflicting with the angularity of the co-operating portions of the partial threads on the screw. Particular characteristics of different batches of rubber may lead the operator in his judgment to take advantage of this capacity of machine because such different characteristics may call for differences in severity of the treatment best calculated to bring the material to the desired state. As the operation of the machine has been set forth in connection with the description of the form and arrangement of the several parts, there is no necessity for restating it at this junction, but it may be said that the construction and design of the machine provides capacity for acting upon crude rubber of varying characteristics so as to bring it to that condition in which it is readily adapted to the subsequent steps commonly followed in compounding the same and manufacturing articles therefrom.

The parts constituting my invention are readily adapted to any well known or approved form of tubing or extruding machine and will provide a machine which rapidly and efficiently performs the intended function and supplies the material in a condition which is suitable and convenient for transportation and use. It may be remarked that the parts should be made quite strong and securely fastened together in order to withstand the strain of operating, as indicated, upon crude rubber.

It will be understood that various changes may be resorted to in the form, construction and arrangement of the several parts without departing from the spirit and scope of my invention; and hence I do not intend to be limited to the details herein shown and described except as they may be included in the claims.

What I claim is:

1. A stock screw for extruding plastic material comprising, a shaft and a plurality of sections removably secured thereon, each of said sections being provided with a hub and a series of circumferentially arranged formations on its periphery extending throughout the length of the hub to form partial threads in overlapped relation, each of said formations being of substantial height at the front of the hub and arcuately tapered toward the rear, said tapered portion terminating on the hub.

2. A stock screw for extruding plastic material comprising, a shaft and a plurality of sections removably secured thereon, each of said sections being provided with a hub and a series of circumferentially arranged formations on its periphery extending throughout the length of the hub to form partial threads in overlapped relation, each of said formations being of substantial height at the front of the hub and arcuately tapered toward the rear, said tapered portion terminating on the hub, the front and peripheral edges of each formation being flat and disposed at right angles to the vertical plane of the formation.

3. In a machine for extruding plastic material, a cylinder having a longitudinal bore therein, a stock screw disposed in said bore, said stock screw comprising a shaft having a plurality of sections removably secured thereon, each of said sections being provided with a hub and a series of circumferentially arranged formations on its periphery extending throughout the length of the hub to form interrupted threads in overlapped relation, each formation being of substantial height at the front of the hub and arcuately tapered toward the rear, said tapered portion terminating on the hub, and a series of annular elements juxtaposed in horizontal alinement in said cylindrical bore and disposed to surround said screw sections, each of said elements comprising an annular band having a plurality of formations spaced apart on its interior and disposed obliquely to the longitudinal axis, each of said formations being of substantial depth in a radial direction and having a portion of its inner periphery concentric to the longitudinal axis and tapering outwardly and rearwardly therefrom to the band.

4. In a machine for extruding plastic material, a cylinder having a longitudinal bore therein, a stock screw disposed in said bore, said stock screw comprising a shaft having a plurality of sections removably secured thereon, each of said sections being provided with a hub and a series of circumferentially arranged formations on its periphery extending throughout the length of the hub to form interrupted threads in overlapped relation, each formation being of substantial height at the front of the hub and arcuately tapered toward the rear, said tapered portion terminating on the hub, and a series of annular elements juxtaposed in horizontal alinement in said cylindrical bore and disposed to surround said screw sections, each of said elements comprising an annular band having a plurality of formations spaced apart on its interior and disposed obliquely to the horizontal axis, each of said formations being of substantial depth in a radial direction and having a portion of its inner periphery concentric to the longitudinal axis and tapering outwardly and rearwardly therefrom to the band, the inner peripheral edge of each oblique formation being flat and disposed at right angles to the vertical plane of the formation.

5. In a machine for extruding plastic material, a cylinder having a longitudinal bore therein, a stock screw disposed in said bore, said stock screw comprising a shaft having a plurality of sections removably secured thereon, each of said sections being provided with a hub and a series of circumferentially arranged formations on its periphery extending throughout the length of the hub to form interrupted threads in overlapped relation, each formation being of substantial height at the front of the hub and arcuately tapered toward the rear, said tapered portion terminating on the hub, the front and peripheral edges of each formation being flat and disposed at right angles to the vertical plane of the formation, and a series of annular elements juxtaposed in horizontal alinement in said cylindrical bore and disposed to surround said screw sections, each of said elements comprising an annular band having a plurality of slanting formations spaced apart on its interior and disposed obliquely to the longitudinal axis, each of said formations being of substantial depth in a radial direction and having a portion of its inner periphery concentric to the longitudinal axis and tapering outwardly and rearwardly therefrom to the band, the inner peripheral edge of each oblique formation being flat and disposed at right angles to the vertical plane of the formation.

VERNON E. ROYLE.